(12) United States Patent
Truong et al.

(10) Patent No.: US 11,977,006 B2
(45) Date of Patent: May 7, 2024

(54) TEST SYSTEM FOR EVALUATING THERMAL PERFORMANCE OF A HEATSINK

(71) Applicant: Juniper Networks, Inc., Sunnyvale, CA (US)

(72) Inventors: Phu Truong, San Jose, CA (US); Attila I. Aranyosi, Sunnyvale, CA (US); Vu L Le, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 151 days.

(21) Appl. No.: 17/515,762

(22) Filed: Nov. 1, 2021

(65) Prior Publication Data
US 2023/0138556 A1    May 4, 2023

(51) Int. Cl.
G01M 99/00    (2011.01)
G01K 1/143    (2021.01)

(52) U.S. Cl.
CPC .......... *G01M 99/002* (2013.01); *G01K 1/143* (2013.01)

(58) Field of Classification Search
CPC .............................. G01M 99/002; G01K 1/143
See application file for complete search history.

(56) References Cited

U.S. PATENT DOCUMENTS

| | | | |
|---|---|---|---|
| 6,663,278 B1* | 12/2003 | Chien .................... | G01N 25/18 374/43 |
| 2008/0054926 A1* | 3/2008 | Lopez ..................... | G01K 1/16 324/750.06 |
| 2008/0130705 A1 | 6/2008 | Chen et al. | |
| 2008/0165824 A1 | 7/2008 | Ye et al. | |
| 2009/0210190 A1* | 8/2009 | Carlson ................. | G01K 3/005 702/130 |
| 2012/0327969 A1 | 12/2012 | Chan et al. | |
| 2020/0120408 A1 | 4/2020 | Boyd et al. | |

FOREIGN PATENT DOCUMENTS

KR    20160009875 A    1/2016

OTHER PUBLICATIONS

Extended European Search Report for Application No. EP21217110.2, dated Jun. 27, 2022, 18 pages.

* cited by examiner

*Primary Examiner* — Mirellys Jagan
(74) *Attorney, Agent, or Firm* — Harrity & Harrity, LLP

(57) ABSTRACT

A test fixture, for a heatsink, may include a probe assembly with a thermocouple probe configured to removably contact a bottom surface of a pedestal of the heatsink, and measure a surface temperature of the heatsink. The test fixture may include an insulator housing configured to house the probe assembly and a heater block, and to insulate the probe assembly from the heater block. The heater block may be provided within the insulator housing and may be configured to provide heat to the heatsink via the bottom surface of the pedestal of the heatsink. The test fixture may include a mounting block connected to the insulator housing and configured to connect to the heatsink.

20 Claims, 12 Drawing Sheets

TEST SYSTEM FOR EVALUATING THERMAL PERFORMANCE OF A HEATSINK

BACKGROUND

A heatsink is a passive heat exchanger that transfers heat generated by an electronic device or a mechanical device to a fluid medium (e.g., air or a liquid coolant), where the heat is dissipated away from the device, thereby allowing regulation of a temperature of the device.

SUMMARY

Some implementations described herein relate to a test fixture for a heatsink. The test fixture may include a probe assembly with a thermocouple probe configured to removably contact a bottom surface of a pedestal of the heatsink, and measure a surface temperature of the heatsink. The test fixture may include an insulator housing configured to house the probe assembly and a heater block, and to insulate the probe assembly from the heater block. The heater block may be provided within the insulator housing and may be configured to provide heat to the heatsink via the bottom surface of the pedestal of the heatsink. The test fixture may include a mounting block connected to the insulator housing and configured to connect to the heatsink.

Some implementations described herein relate to a test system for a heatsink. The test system may include a test fixture that includes a probe assembly with a thermocouple probe configured to removably contact a bottom surface of a pedestal of the heatsink, and measure a surface temperature of the heatsink. The test fixture may include an insulator housing configured to house the probe assembly and a heater block, and to insulate the probe assembly from the heater block. The heater block may be provided within the insulator housing and may include one or more heaters configured to provide heat to the heatsink via the bottom surface of the pedestal of the heatsink. The test fixture may include a mounting block connected to the insulator housing and configured to connect to the heatsink. The test system may include a computing device configured to provide power to the one or more heaters to cause the one or more heaters to provide heat to the heatsink via the bottom surface of the pedestal of the heatsink. The computing device may be configured to receive a temperature reading from the thermocouple probe, and calculate a thermal resistance of the heatsink based on the temperature reading.

Some implementations described herein relate to a probe assembly of a test fixture for a heatsink. The probe assembly may include a thermocouple probe configured to measure a surface temperature of the heatsink, and a base portion with an opening for receiving the thermocouple probe. The probe assembly may include a spring-loaded collet assembly connected to the thermocouple probe via the opening of the base portion and configured to cause the thermocouple probe to removably contact a bottom surface of a pedestal of the heatsink. The probe assembly may include a thermocouple cable connected to the thermocouple probe and configured to communicate the surface temperature of the heatsink.

DETAILED DESCRIPTION

Figure 1A:
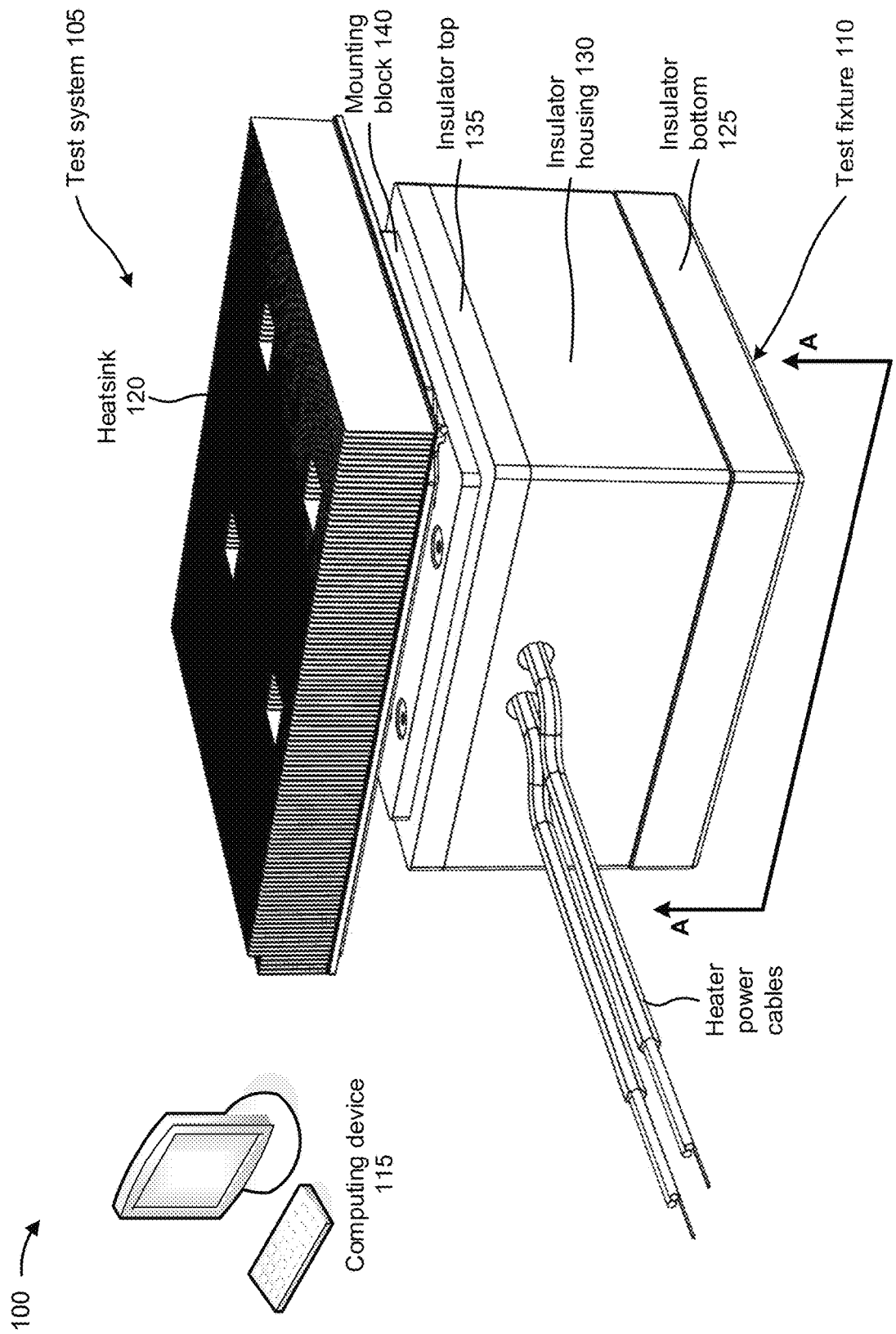
FIGS. 1A-1I are diagrams of an example test system for evaluating thermal performance of a heatsink.

The following detailed description of example implementations refers to the accompanying drawings. The same reference numbers in different drawings may identify the same or similar elements.

Heatsink performance may be determined based on a surface/air thermal resistance ($R_{sa}$) between a surface of a heatsink pedestal and inlet air conditions. In addition to air flow rate and heat dissipation through the heatsink, temperatures of the inlet air and the pedestal surface may be measured to verify the heatsink performance in terms of the thermal resistance. The thermal resistance of a heatsink is typically measured by machining a groove or boring a small hole parallel to the pedestal surface and attaching a thermocouple near a center of the pedestal surface. This allows the pedestal surface to be measured without disturbing the thermal interface. Unfortunately, such a measurement technique is very time consuming, resource intensive, and destructive to the heatsink. Furthermore, changes in heatsink manufacturing processes, heatsink suppliers, and/or the like may require frequent heatsink testing and verification to ensure that the changes provide a heatsink with a reliable performance. Thus, current techniques for measuring a thermal resistance of a heatsink consume computing resources (e.g., processing resources, memory resources, communication resources, and/or the like), machine resources, and/or the like associated with destroying heatsinks being tested until the thermal resistance satisfies a threshold thermal resistance, machining heatsinks and attaching thermocouples to measure the thermal resistances, and/or the like.

Some implementations described herein relate to a test system for evaluating thermal performance of a heatsink. For example, the test system may include a test fixture that includes a probe assembly with a thermocouple probe configured to removably contact a bottom surface of a pedestal of the heatsink, and measure a surface temperature of the heatsink. The test fixture may include an insulator housing configured to house the probe assembly and a heater block, and to insulate the probe assembly from the heater block. The heater block may be provided within the insulator housing and may include one or more heaters configured to provide heat to the heatsink via the bottom surface of the pedestal of the heatsink. The test fixture may include a mounting block connected to the insulator housing and configured to connect to the heatsink. The test system may include a computing device configured to provide power to the one or more heaters to cause the one or more heaters to provide heat to the heatsink via the bottom surface of the pedestal of the heatsink. The computing device may be configured to receive a temperature reading from the thermocouple probe, and to calculate a thermal resistance of the heatsink based on the temperature reading.

In this way, a test system may be provided for evaluating thermal performance of a heatsink. For example, the test system may include a test fixture with a heater block and an insulator housing configured to support and thermally insulate the heater block. Heaters may be provided in the heater block. The test fixture may include a probe assembly with a thermocouple probe provided through a center portion of the heater block and engaging a pedestal surface of a heatsink to be tested when the heatsink is attached to the test fixture. The heatsink may be mounted to an insulator top of the insulator housing. The test fixture may be easy to reset between tests without damaging the heatsink, thermocouples, or any other part of the test fixture. Thus, the test system provides a non-destructive way to test the thermal performance of the heatsink and conserves computing resources, machine resources, and/or the like associated with destroying heatsinks being tested until the thermal resistance satisfies a threshold thermal resistance, machining heatsinks and attaching thermocouples to measure the thermal resistances, and/or the like.

FIGS. 1A-1I are diagrams of an example 100 associated with a test system 105 for evaluating thermal performance of a heatsink 120. As shown in FIGS. 1A-1I, the test system 105 includes a test fixture 110 and a computing device 115. Further details of the test fixture 110, the computing device 115, and the heatsink 120 are provided elsewhere herein.

As shown in FIG. 1A, the test fixture 110 may include an insulator bottom 125, an insulator housing 130, an insulator top 135, and a mounting block 140 connected to the heatsink 120 being tested. The heatsink 120 may include a passive heat exchanger that transfers heat generated by an electronic device or a mechanical device to a fluid medium (e.g., air or a liquid coolant), where the heat is dissipated away from the device, thereby allowing regulation of a temperature of the device. Further details of the heatsink 120 are provided below in connection with FIG. 1C. The insulator bottom 125 may connect to the insulator housing 130. The insulator housing 130 may connect to the insulator top 135 and may include openings for receive heater power cables for heaters provided in the test fixture 110. The mounting block 140 may connect to the insulator top 135 and may retain the heatsink 120 for testing. Further details of the insulator bottom 125, the insulator housing 130, the insulator top 135, and the mounting block 140 are provided elsewhere herein.

Figure 1B:
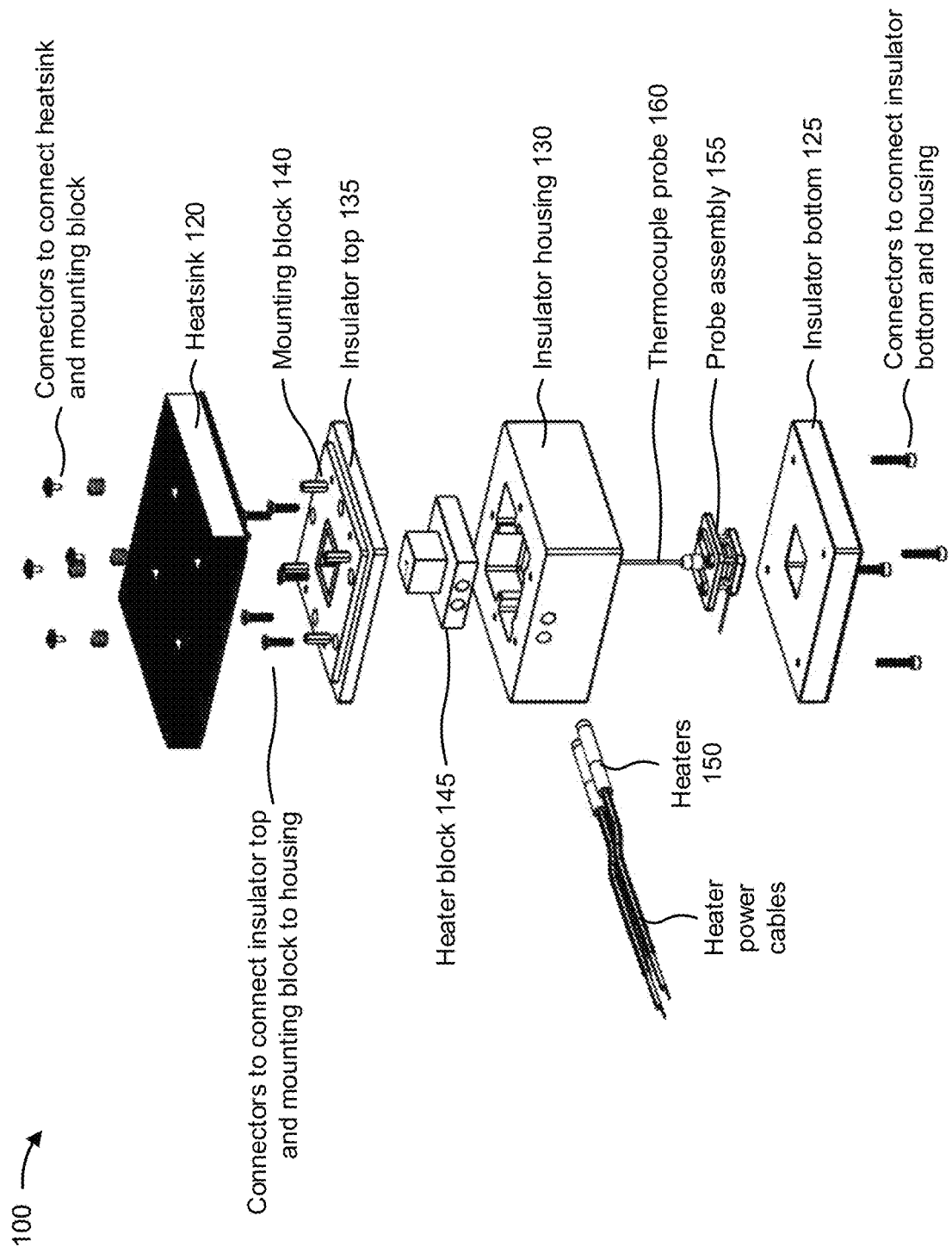

FIG. 1B is an exploded perspective view of the test fixture 110 and the heatsink 120. As shown, the test fixture 110 may include the insulator bottom 125, the insulator housing 130, the insulator top 135, the mounting block 140, a heater block 145, heaters 150, and a probe assembly 155 with a thermocouple probe 160.

The insulator bottom 125 may be configured to receive and retain a bottom portion of the probe assembly 155 and to thermally insulate the bottom portion of the probe assembly 155 from the heater block 145. The insulator bottom 125 may be made from a variety of materials, such as polystyrene, polyurethane, a fiberglass-epoxy laminate material, and/or the like. The insulator bottom 125 may be sized and shaped depending on the size and shape of the heatsink 120 being tested. For example, the size of the insulator bottom 125 may increase as the size of the heatsink 120 increases, and the size of the insulator bottom 125 may decrease as the size of the heatsink 120 decreases. As further shown in FIG. 1B, a plurality of connectors (e.g., screws, bolts, and/or the like) may be utilized to connect the insulator bottom 125 to the insulator housing 130. Further details of the insulator bottom 125 are provided below in connection with FIG. 1H.

The insulator housing 130 may be configured to receive and retain a top portion of the probe assembly 155 and a base portion of the heater block 145. The insulator housing may also be configured to thermally insulate the top portion of the probe assembly 155 from the heater block 145. The insulator housing 130 may be made from a variety of materials, such as polystyrene, polyurethane, a fiberglass-epoxy laminate material, and/or the like. The insulator housing 130 may be sized and shaped depending on the size and shape of the heatsink 120 being tested. For example, the size of the insulator housing 130 may increase as the size of the heatsink 120 increases, and the size of the insulator housing 130 may decrease as the size of the heatsink 120 decreases. Further details of the insulator housing 130 are provided below in connection with FIG. 1F.

The insulator top 135 may be configured to receive and retain a top portion of the heater block 145 and to connect to the mounting block 140. The insulator top 135 may be configured to thermally insulate the mounting block 140 from the heater block 145. The insulator top 135 may be made from a variety of materials, such as polystyrene, polyurethane, a fiberglass-epoxy laminate material, and/or the like. The insulator top 135 may be sized and shaped depending on the size and shape of the heatsink 120 being tested. For example, the size of the insulator top 135 may increase as the size of the heatsink 120 increases, and the size of the insulator top 135 may decrease as the size of the heatsink 120 decreases. As further shown in FIG. 1B, a plurality of connectors (e.g., screws, bolts, and/or the like) may be utilized to connect the insulator top 135 and the mounting block 140 to the insulator housing 130. Further details of the insulator top 135 are provided below in connection with FIG. 1D.

The mounting block 140 may connect to the insulator top 135 via a connection mechanism (e.g., glue, screws, bolts, and/or the like). The mounting block 140 may be configured to receive and retain the heatsink 120. The mounting block 140 may be made from a variety of materials, such as aluminum, steel, and/or the like. The mounting block 140 may be sized and shaped depending on the size and shape of the heatsink 120 being tested. For example, the size of the mounting block 140 may increase as the size of the heatsink 120 increases, and the size of the mounting block 140 may decrease as the size of the heatsink 120 decreases. As further shown in FIG. 1B, a plurality of connectors (e.g., screws, bolts, springs and/or the like) may be utilized to connect the heatsink 120 to the mounting block 140. Further details of the mounting block 140 are provided below in connection with FIG. 1D.

The heater block 145 may be configured to provide heat to the heatsink 120 via a bottom surface of a pedestal of the heatsink 120. A base portion of the heater block 145 may be received and retained in an opening of the insulator housing 130, and a top portion of the heater block 145 may be received and retained through an opening provided through the insulator top 135 and the mounting block 140. The top portion of the heater block 145 may contact and provide heat to the bottom surface of the pedestal of the heatsink 120. The heater block 145 may be made from a variety of materials, such as copper, tungsten, aluminum, and/or the like. The heater block 145 may be sized and shaped depending on the size and shape of the heatsink 120 being tested. For example, the size of the heater block 145 may increase as the size of the heatsink 120 increases, and the size of the heater block 145 may decrease as the size of the heatsink 120 decreases. As further shown in FIG. 1B, the base portion of the heater block 145 may include openings for receiving and retaining the heaters 150. Further details of the heater block 145 are provided below in connection with FIG. 1E.

The heaters 150 may be configured to provide heat to the heater block 145 when power is provided to the heaters 150 via the heater power cables. In some implementations, the heaters 150 may be provided in openings of the heater block 145 and may heat the heater block 145 from within the openings. In some implementations, each of the heaters 150 may include a cartridge heater, which is a tube-shaped, industrial heating element that can be inserted into drilled holes. In such implementations, each of the heaters 150 may include a resistance coil wound around a ceramic core that is surrounded by a dielectric material and encased in a metal sheath. Powered heat may be transferred through the resistance coil to the metal sheath. The metal sheath may transfer the heat to an inside of the heater block 145.

The probe assembly 155 may include a base portion with an opening for receiving the thermocouple probe 160, and a spring-loaded collet assembly connected to the thermocouple probe 160 via the opening of the base portion and configured to cause the thermocouple probe 160 to removably contact a bottom surface of a pedestal of the heatsink 120. The probe assembly 155 may also include a thermocouple cable connected to the thermocouple probe 160 and configured to communicate the surface temperature of the heatsink 120. A bottom portion of the probe assembly 155 may be received and retained in an opening of the insulator bottom 125, and the base portion of the probe assembly 155 (e.g., and a portion of the thermocouple probe 160) may be received and retained in an opening of the insulator housing 130. The probe assembly 155 may be made from a variety of materials, such as a metal (e.g., aluminum), a plastic, and/or the like. The probe assembly 155 may be sized and shaped depending on the size and shape of the heatsink 120 being tested. For example, the size of the probe assembly 155 may increase as the size of the heatsink 120 increases, and the size of the probe assembly 155 may decrease as the size of the heatsink 120 decreases. Further details of the probe assembly 155 are provided below in connection with FIG. 1G.

The thermocouple probe 160 may be configured to removably contact a bottom surface of a pedestal of the heatsink 120, and measure a surface temperature of the heatsink 120. The thermocouple probe 160 may include a rod through which a thermocouple and the thermocouple cable (e.g., connected to the thermocouple) is provided. A portion of the rod may be provided through an opening provided in the heater block 145 so that the thermocouple may removably contact the bottom surface of the pedestal of the heatsink 120. The thermocouple may include an electrical device with dissimilar electrical conductors forming an electrical junction. The thermocouple may generate a temperature-dependent voltage as a result of the Seebeck effect, and this voltage may provide a measurement of temperature. Further details of the thermocouple probe 160 are provided below in connection with FIG. 1G.

Figure 1C:
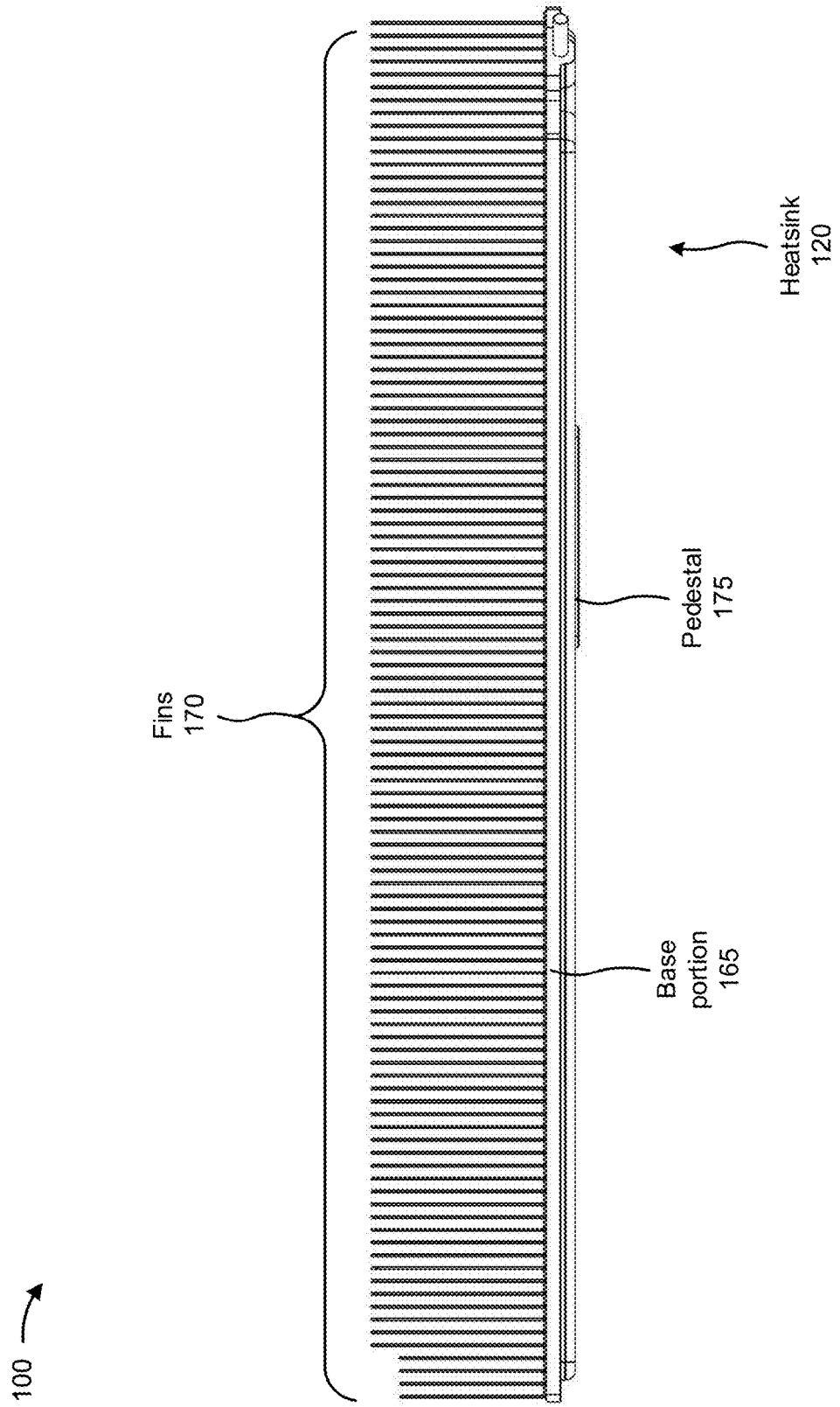

FIG. 1C is a side view of the heatsink 120 to be tested by the test system 105. The heatsink 120 may be formed from a variety of materials, such as an aluminum alloy, copper, and/or the like. The heatsink 120 may include a variety of sizes and shapes that depend upon a size and a shape of a device or a component to be cooled by the heatsink 120. As shown in FIG. 1C, the heatsink 120 may include a base portion 165 that supports a plurality of fins 170, and a pedestal 175 that supports the base portion 165. The base portion 165 may include a plate on which the fins 170 are formed. Each fin 170 may include a flat plate configured to receive heat flowing in one end and to dissipate the heat into a surrounding fluid. As heat flows through the fin 170, a combination of a thermal resistance of the heatsink 120 impeding the flow and the heat lost due to convection, temperature of the fin 170 and, therefore, the heat transfer to the fluid, may decrease from the base portion 165 to the end of the fin 170. The pedestal 175 may be formed with the base portion 165 and may include the portion of the heatsink 120 that contacts a device or a component to be cooled by the heatsink 120.

Figure 1D:
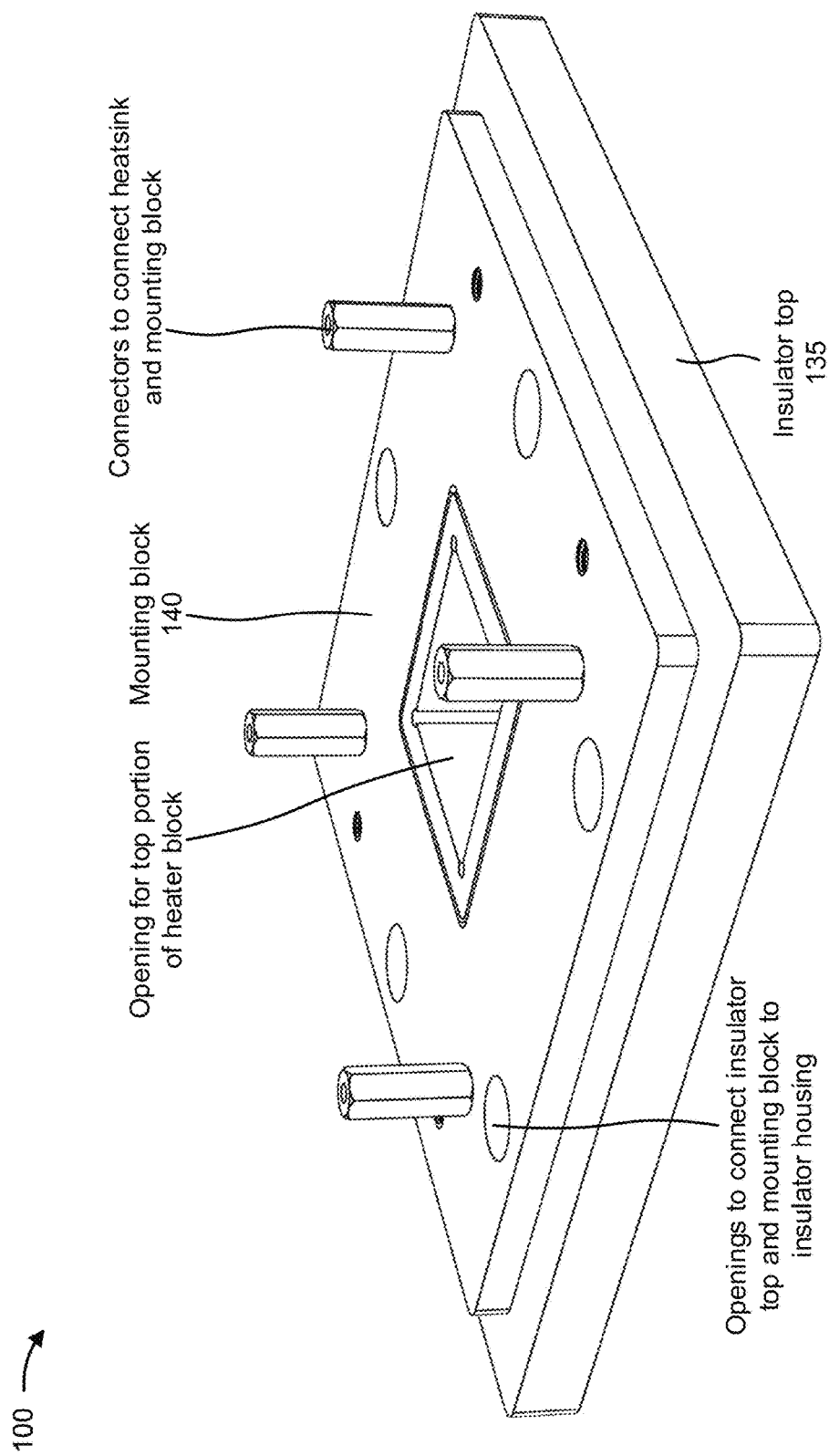

FIG. 1D is a perspective view of the insulator top 135 and the mounting block 140 of the test fixture 110. As shown, openings may be provided through the insulator top 135 and the mounting block 140. The openings may receive the connectors (as shown in FIG. 1B) that connect the insulator top 135 and the mounting block 140 to the insulator housing 130. Another opening may be provided through the insulator top 135 and the mounting block 140. The other opening may be sized and shaped to receive and retain the top portion of the heater block 145. As further shown in FIG. 1D, connectors may connect to and extend away from the mounting block 140. The connectors shown in FIG. 1D may receive the connectors shown in FIG. 1B so that the heatsink 120 and the mounting block 140 may be connected.

Figure 1E:
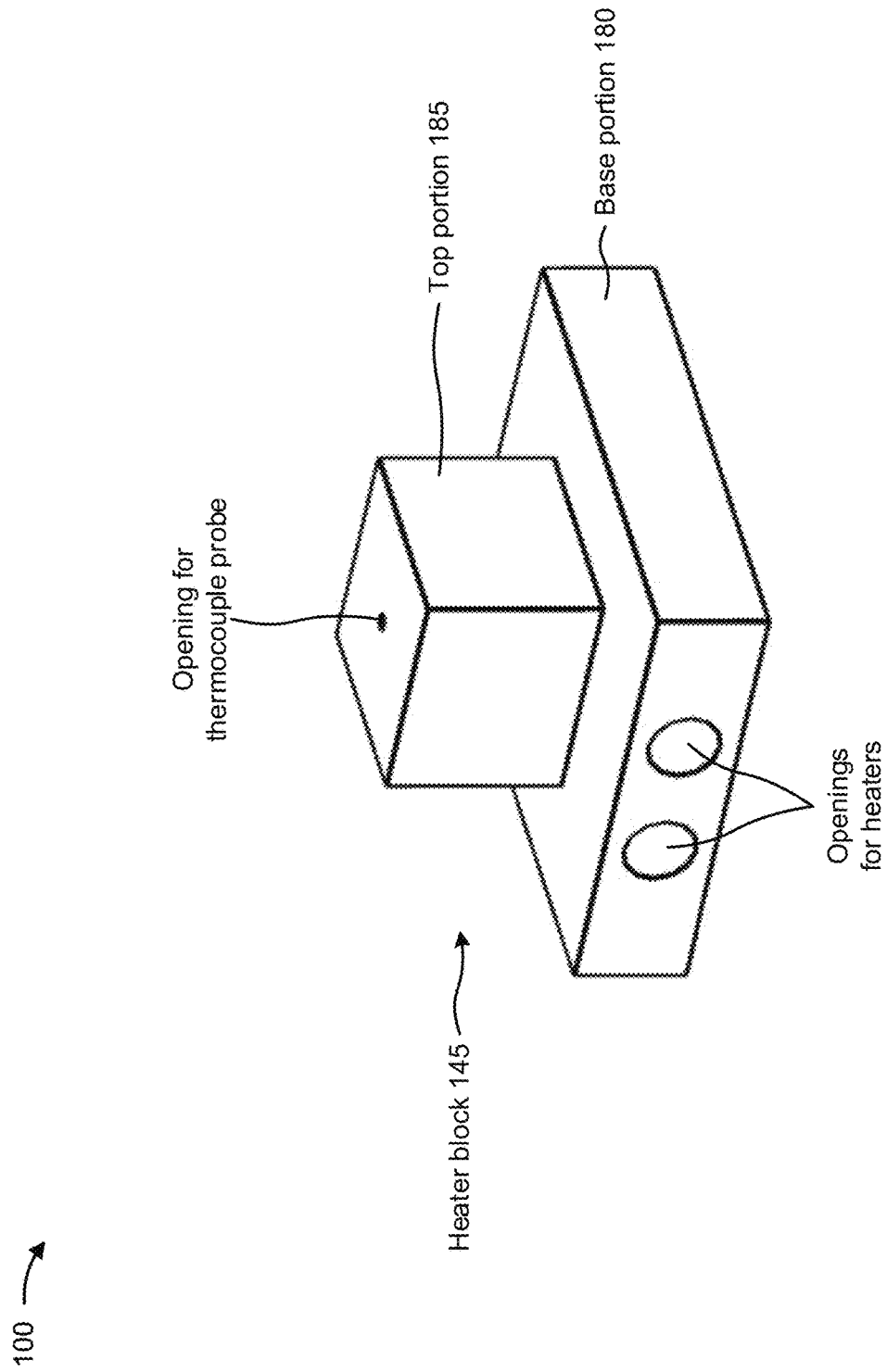

FIG. 1E is a perspective view of the heater block 145 of the test fixture 110. As shown, the heater block 145 may include a base portion 180 and a top portion 185. The base portion 180 of the heater block 145 may be received and retained in an opening of the insulator housing 130, and the top portion 185 of the heater block 145 may be received and retained through the opening provided through the insulator top 135 and the mounting block 140 (as shown in FIG. 1D). The top portion 185 of the heater block 145 may contact and provide heat to the bottom surface of the pedestal 175 of the heatsink 120. Openings may be provided in the base portion 180 of the heater block 145. The openings may receive and retain the heaters 150 and may enable the heaters 150 to heat the heater block 145. As further shown in FIG. 1E, another opening may be provided through the base portion 180 and the top portion of the heater block 145. The other opening may receive and retain a portion of thermocouple probe 160 and enable the top of the thermocouple probe 160 to removably contact the bottom surface of the pedestal 175 of the heatsink 120 and to measure the surface temperature of the heatsink 120.

Figure 1F:
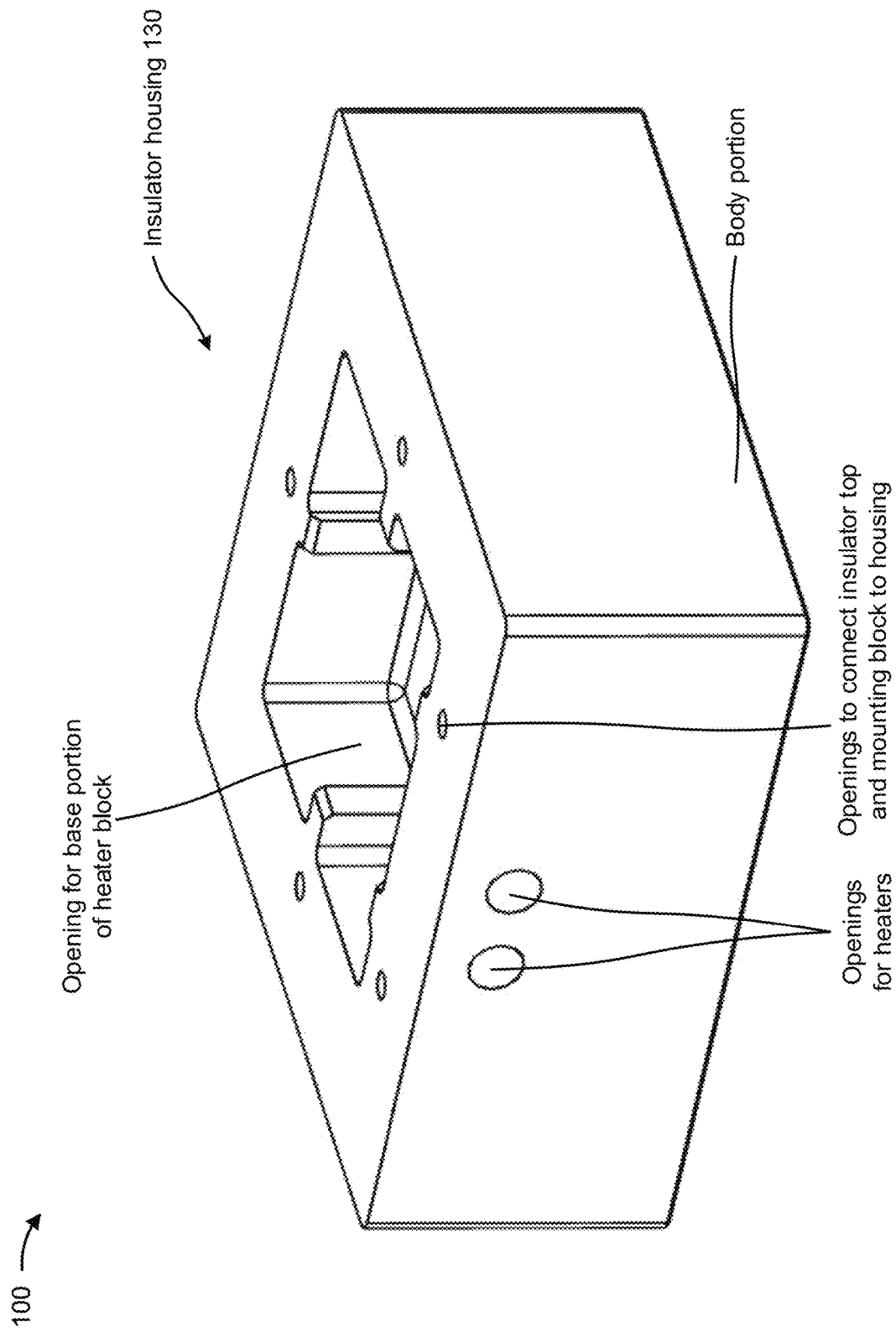

FIG. 1F is a perspective view of the insulator housing 130 of the test fixture 110. As shown, the insulator housing 130 may include a body portion. The body portion may include an opening to receive and retain the base portion 180 of the heater block 145. The body portion may also include openings through which the heaters 150 may be provided to the openings of the base portion of the heater block 145. The body portion may include other openings that may receive the connectors that connect the insulator top 135 and the mounting block 140 to the insulator housing 130. In some implementations, the insulator housing 130 may insulate the probe assembly 155 from the heater block 145.

Figure 1G:
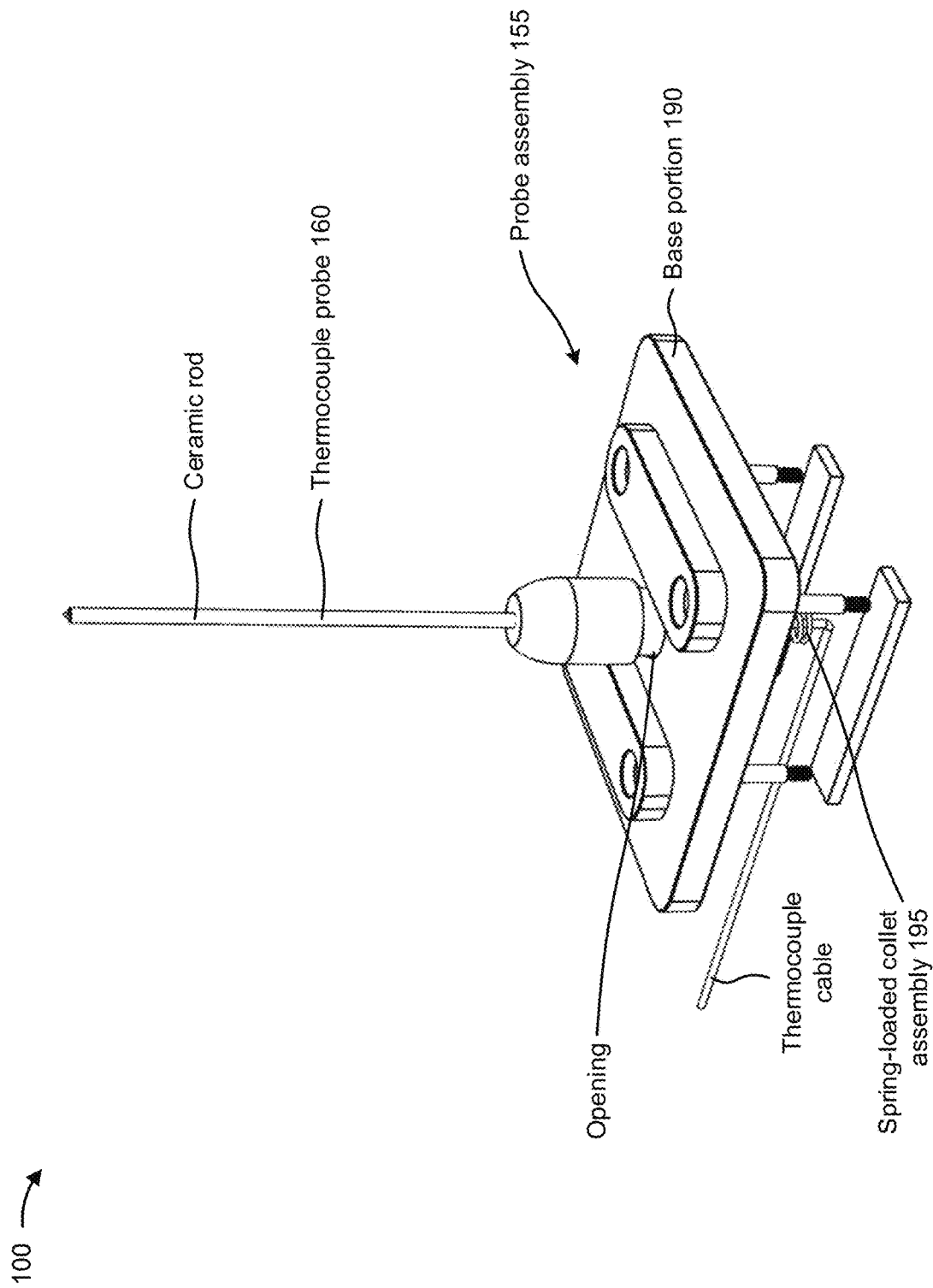

FIG. 1G is a perspective view of the probe assembly 155 of the test fixture 110. As shown, the probe assembly 155 may include the thermocouple probe 160 and a base portion 190 with an opening for receiving the thermocouple probe 160. The probe assembly 155 may include a spring-loaded collet assembly 195 connected to the thermocouple probe 160 via the opening of the base portion 190 and configured to cause the thermocouple probe 160 to removably contact the bottom surface of the pedestal 175 of the heatsink 120. For example, the spring-loaded collet assembly 195 may force a tip of the thermocouple probe 160 to extend slightly above a top surface of the top portion 185 of the heater block 145 so that the thermocouple probe 160 may contact the bottom surface of the pedestal 175 of the heatsink 120.

As further shown in FIG. 1G, the probe assembly 155 may include a thermocouple cable connected to the thermocouple probe 160 and configured to communicate the surface temperature of the heatsink 120, measured by the thermocouple probe 160, to the computing device 115. In some implementations, the thermocouple probe 160 may include a thermocouple and a two-hole ceramic rod through which the thermocouple is provided and connected to the thermocouple cable. The thermocouple may measure the surface temperature of the heatsink 120. The surface temperature of the heatsink, as measured by the thermocouple, may provide a measure of a thermal resistance of the heatsink 120. A portion of the thermocouple probe 160 may be configured to pass through the opening of a heater block 145 (as shown in FIG. 1E).

Figure 1H:
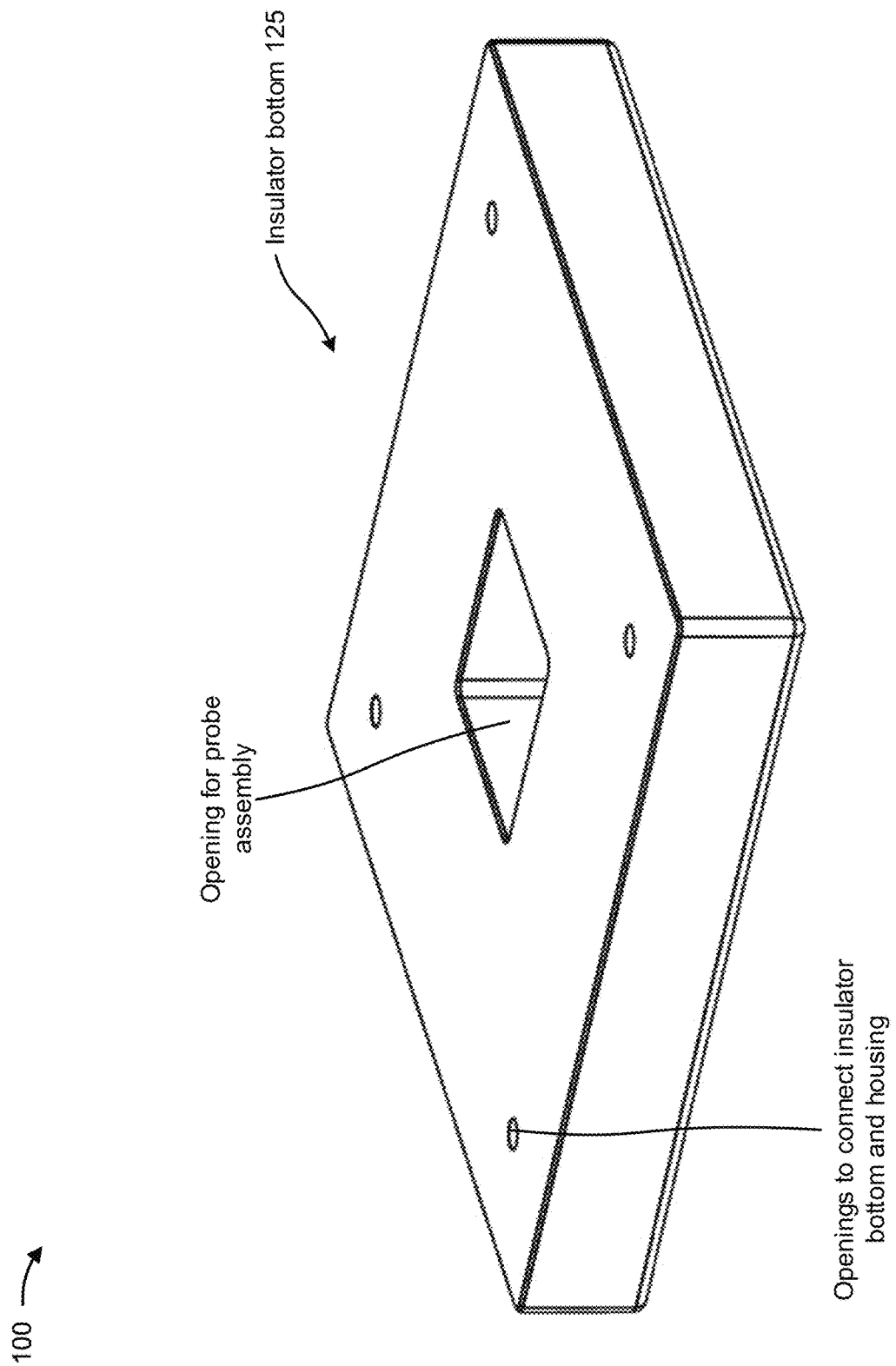

FIG. 1H is a perspective view of the insulator bottom 125 of the test fixture 110. As shown, openings may be provided through the insulator bottom 125. The openings may receive the connectors (as shown in FIG. 1B) that connect the insulator bottom 125 to the insulator housing 130. Another opening may be provided in the insulator bottom 125. The other opening may be sized and shaped to receive and retain a bottom portion of the probe assembly 155 and to thermally insulate the bottom portion of the probe assembly 155 from the heater block 145.

Figure 1I:
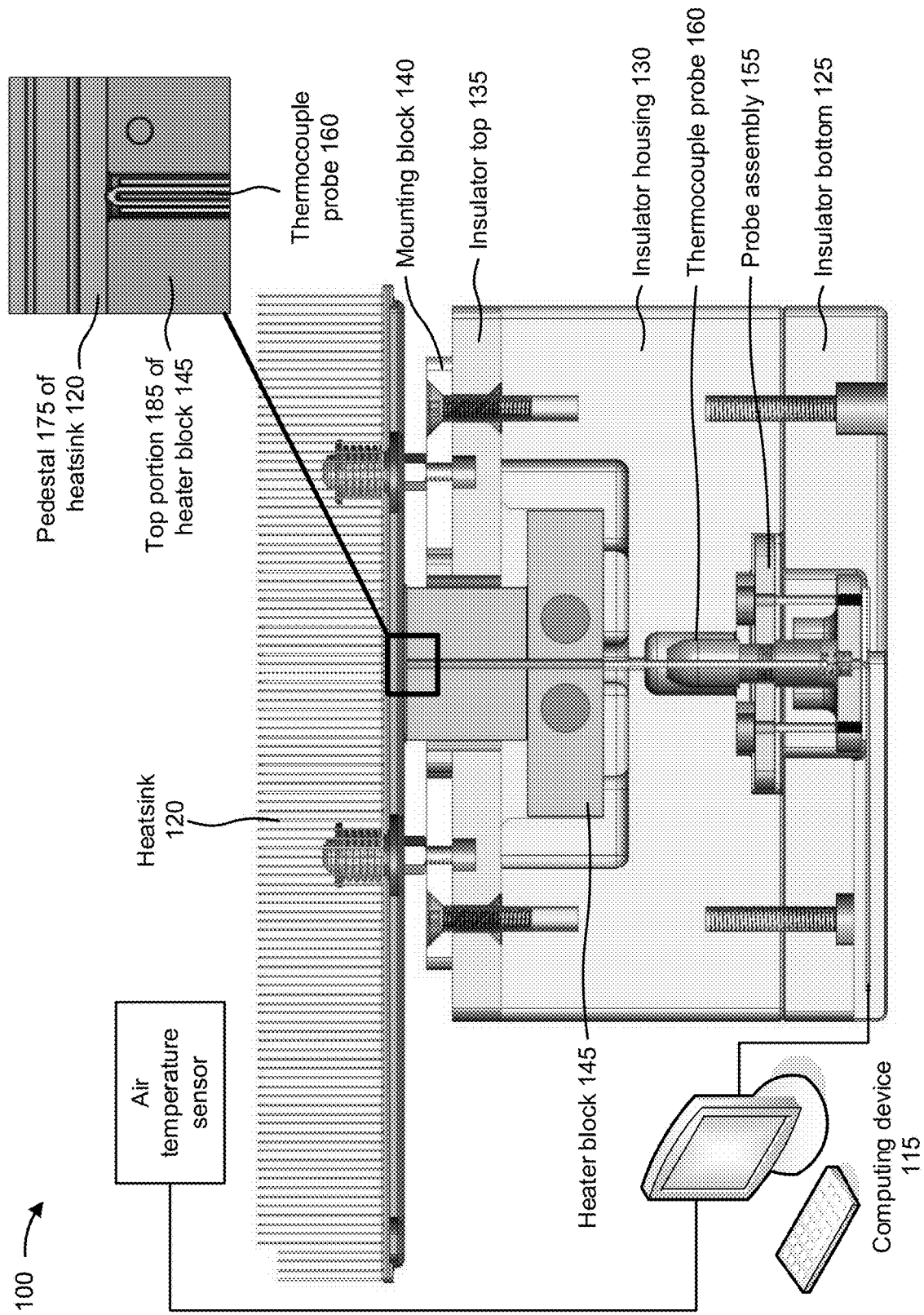

FIG. 1I is a cross-sectional view, taken along line A-A shown in FIG. 1A, of the test fixture 110. As shown in FIG. 1I, the insulator bottom 125 may connect to the insulator housing 130 and may receive and retain the bottom portion of the probe assembly 155. The insulator housing 130 may receive and retain the top portion of the probe assembly 155 and the thermocouple probe 160, and may receive and retain the base portion 180 of the heater block 145. A portion of the thermocouple probe 160 may be provided through the opening provided through the heater block 145. As further shown, the insulator top 135 and the mounting block 140 may connect to the insulator housing 130 and may receive and retain the top portion 185 of the heater block 145. The mounting block 140 may connect the heatsink to the test fixture 110. As shown in the exploded view of FIG. 1I, the top portion 185 of the heater block 145 may contact and heat the bottom surface of the pedestal 175 of the heatsink 120. The tip of the thermocouple probe 160 may extend slightly above the top surface of the top portion 185 of the heater block 145 so that the thermocouple probe 160 may contact the bottom surface of the pedestal 175 of the heatsink 120 and measure a surface temperature of the heatsink 120.

As further shown in FIG. 1I, the computing device 115 may communicate with the thermocouple probe 160 via the thermocouple cable and may communicate with an air temperature sensor the measures a temperature of the air around the heatsink. In order to measure a thermal resistance of the heatsink 120, the heatsink 120 may be connected to the mounting block 140 of the test fixture 110 via the connectors. When the heatsink 120 is connected to the mounting block 140, the thermocouple probe 160 of the probe assembly 155 may contact the bottom surface of the pedestal 175 of the heatsink 120. The computing device 115 may provide power to the heaters 150 of the heater block 145 to cause the heaters 150 to provide heat to the heatsink 120 via the bottom surface of the pedestal 175 of the heatsink 120. While the heat is provided to the heatsink 120, the computing device 115 may receive a temperature reading from the thermocouple probe 160, and may receive an air temperature reading from the air temperature sensor associated with the heatsink 120. The computing device 115 may calculate the thermal resistance of the heatsink 120 based on the temperature reading, the air temperature reading, and the power provided to the heaters 150. In some implementations, if $T_s$ is the temperature reading from the thermocouple probe 160, $T_a$ is the air temperature reading, and Q is the power provided to the heaters 150, the computing may calculate the thermal resistance ($R_{sa}$) of the heatsink 120 as follows:

$$R_{sa} = \frac{T_s - T_a}{Q}.$$

In this way, the test system 105 may be provided for evaluating thermal performance of the heatsink 120. For example, the test system 105 may include the test fixture 110 with the heater block 145 and the insulator housing 130 configured to support and thermally insulate the heater block 145. The heaters 150 may be provided in the heater block 145. The test fixture 110 may include the probe assembly 155 with the thermocouple probe 160 provided through a center portion of the heater block 145 and engaging the pedestal 175 surface of the heatsink 120 to be tested when the heatsink 120 is attached to the test fixture 110. The heatsink 120 may be mounted to the insulator top 135 of the insulator housing 130. The test fixture 110 may be easy to reset between tests without damaging the heatsink 120, thermocouples, or any other part of the test fixture 110. Thus, the test system 105 provides a non-destructive way to test the thermal performance of the heatsink 120 and conserves computing resources, machine resources, and/or the like associated with destroying heatsinks 120 being tested until the thermal resistance satisfies a threshold thermal resistance, machining heatsinks 120 and attaching thermocouples to measure the thermal resistances, and/or the like.

Furthermore, the test system 105 provides an opportunity to test several heatsink samples, during all stages of a heatsink lifecycle. This may enable detection of any heatsink issues associated with mass production of heatsinks, changes in manufacturing processes or changes in suppliers, and/or the like. Thus, the test system 105 may provide improved quality and process control of heatsinks.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
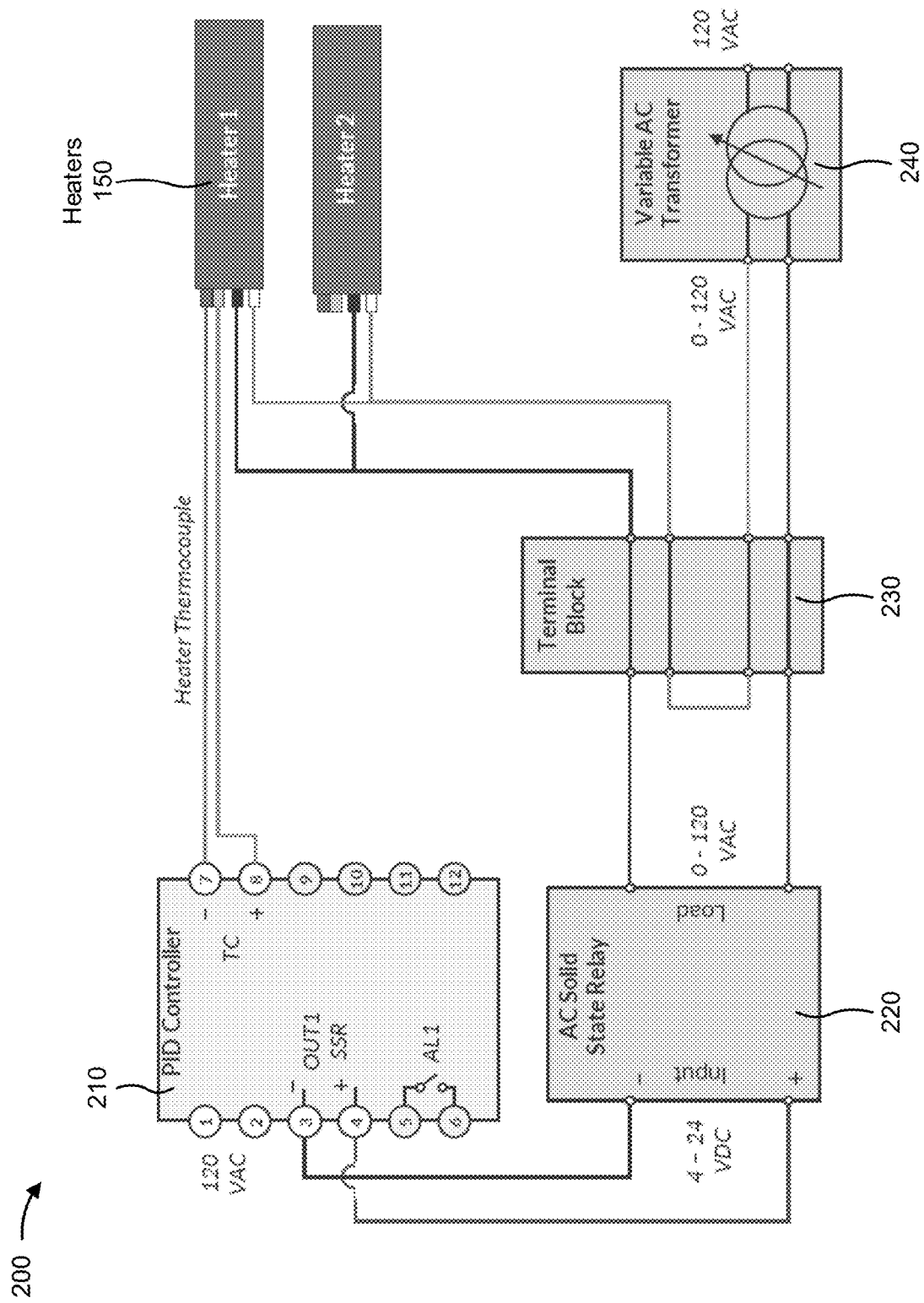
FIG. 2 is a diagram of an example thermal management system of the test system of FIG. 1.

FIG. 2 is a diagram of an example thermal management system 200 of the test system 105 of FIG. 1. As shown in FIG. 2, the thermal management system 200 may include the heaters 150, a proportional-integral-derivative (PID) controller 210, an alternating current (AC) solid state relay 220, a terminal block 230, and a variable AC transformer 240. Devices of the thermal management system 200 may interconnect via wired connections, wireless connections, or a combination of wired and wireless connections. In some implementations, the thermal management system 200 may be controlled by the computing device 115.

The PID controller 210 includes a control loop mechanism that employs feedback for continuously modulated control. The PID controller 210 may continuously calculate an error value as a difference between a desired setpoint and a measured process variable, and may apply a correction based on proportional, integral, and derivative terms. In some implementations, the PID controller 210 may be set to a maximum temperature limit to prevent thermal runaway and to maintain a constant heat flux. Alternatively, the PID controller 210 may be utilized to maintain a fixed temperature.

The AC solid state relay 220 includes an electronic switching device that switches on or off when an external AC voltage is applied across control terminals of the device. The AC solid state relay 220 may include a sensor that responds to an input (e.g., a control signal), a solid-state electronic switching device that switches power to load circuitry, and a coupling mechanism to enable the control signal to activate the switching device without mechanical parts. In some implementations, a power input to the heaters 150 may be switched on or off by the AC solid state relay 220 via the PID controller 210.

The terminal block 230 may include terminals (e.g., for connecting to wires) arranged with several screws along two or more strips. The terminal block 230 may create a bus bar for power distribution and may also include a master input connector.

The variable AC transformer 240 includes a device that produces differing levels of AC output voltage from a single AC input voltage. The variable AC transformer 240 may provide users with an efficient, trouble-free way to change voltage in a short amount of time. In some implementations, an output of the heaters 150 may be set by the variable AC transformer 240 by controlling a maximum voltage provided to the heaters 150.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the thermal management system 200 may perform one or more functions described as being performed by another set of devices of the thermal management system 200.

Figure 3:
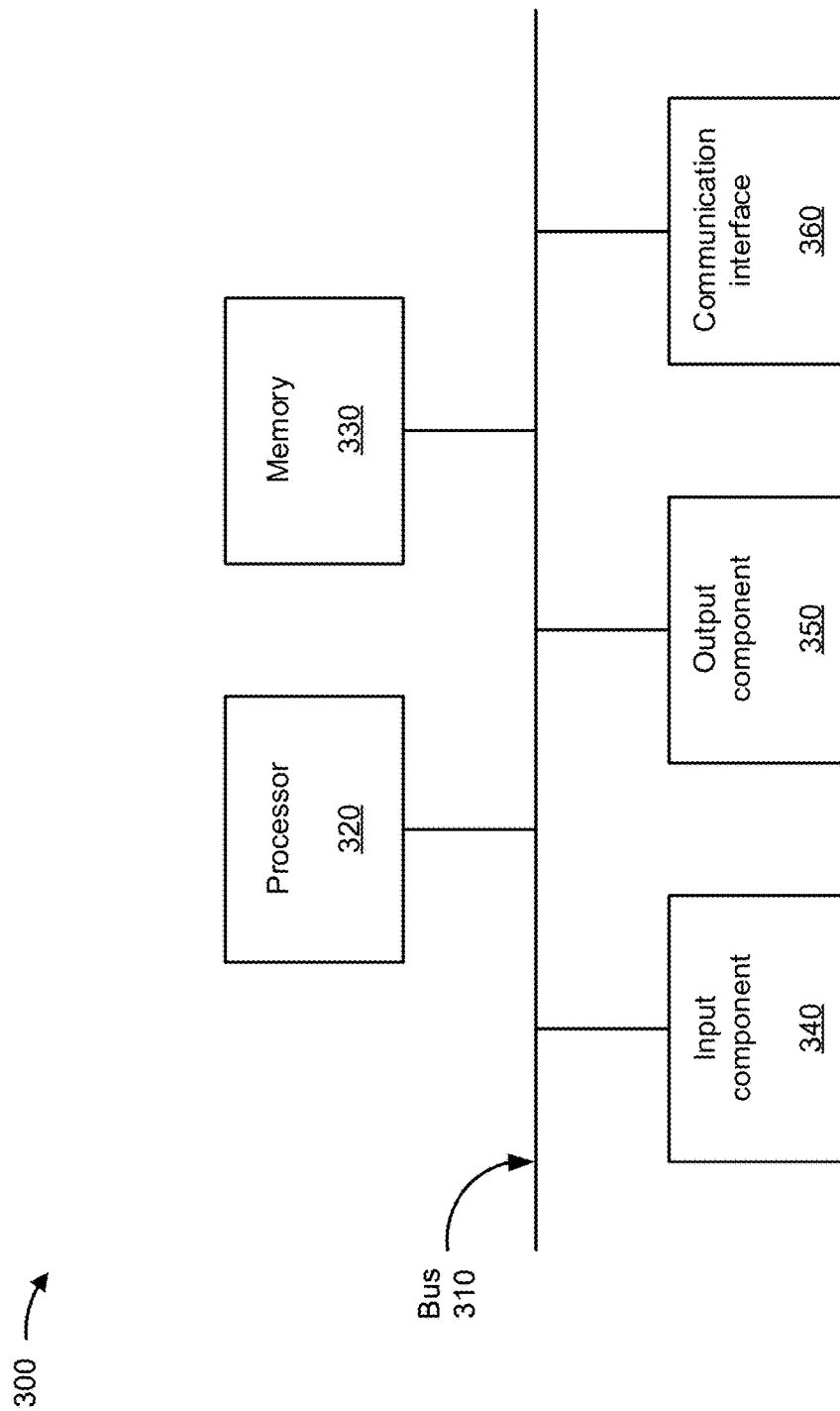
FIG. 3 is a diagram of example components of a computing device of FIG. 1.

FIG. 3 is a diagram of example components that may be included in a device 300, which may correspond to the computing device 115 and/or the thermal management system 200. In some implementations, the computing device 115 and/or the thermal management system 200 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
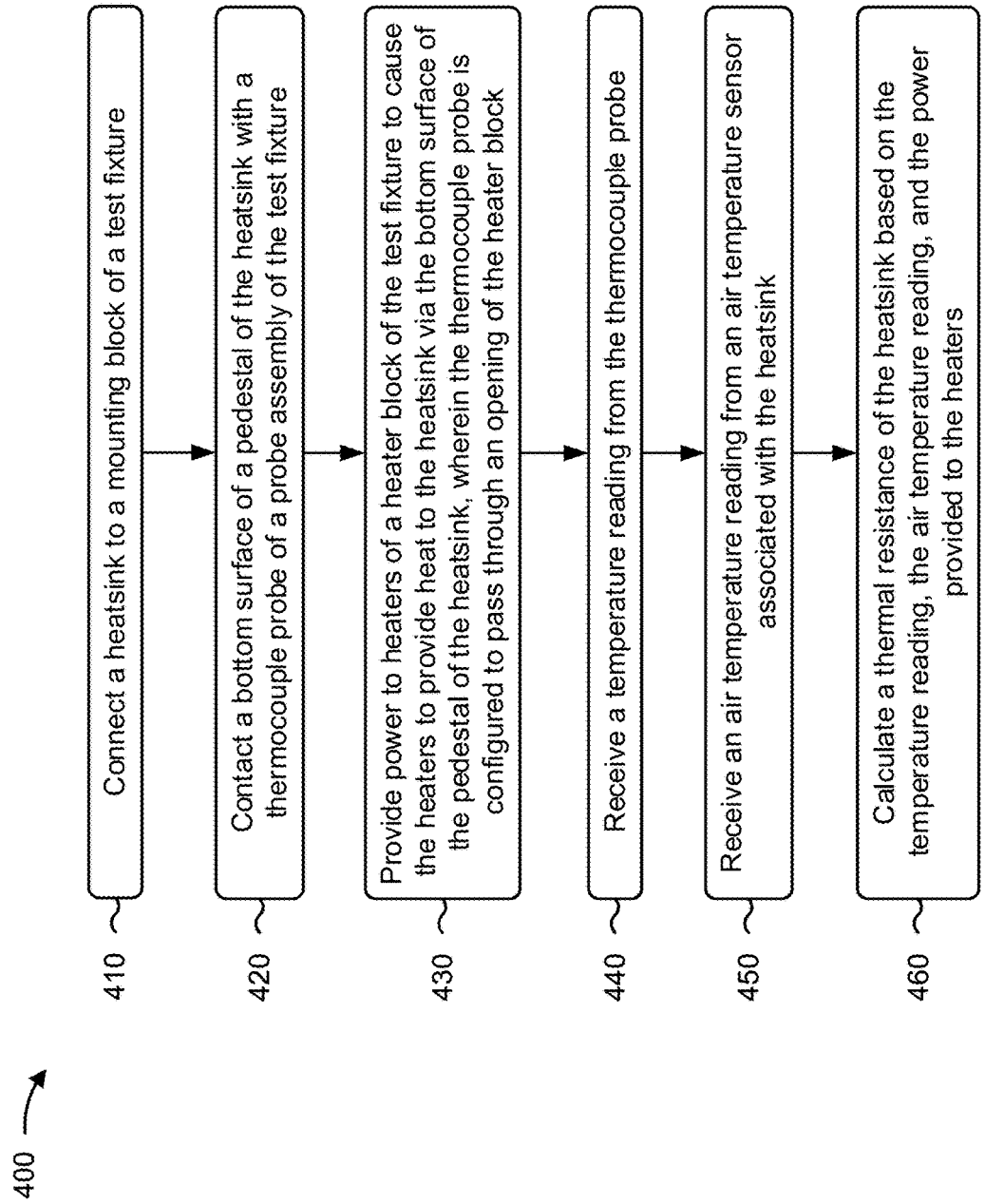
FIG. 4 is a flowchart of an example process for utilizing a test system for evaluating thermal performance of a heatsink.

FIG. 4 is a flowchart of an example process 400 for utilizing a test system for evaluating thermal performance of a heatsink. In some implementations, one or more process blocks of FIG. 4 may be performed via a test system (e.g., the test system 105). In some implementations, one or more process blocks of FIG. 4 may be performed via another device or a group of devices separate from or including the test system. Additionally, or alternatively, one or more process blocks of FIG. 4 may be performed via one or more components of the device 300, such as the processor 320, the memory 330, the input component 340, the output component 350, and/or the communication interface 360.

As shown in FIG. 4, process 400 may include connecting a heatsink to a mounting block of a test fixture (block 410). For example, the heatsink 120 may be connected to the mounting block 140 of the test fixture 110, as described above.

As further shown in FIG. 4, process 400 may include contacting a bottom surface of a pedestal of the heatsink with a thermocouple probe of a probe assembly of the test fixture (block 420). For example, the thermocouple probe 160 of the probe assembly 155 of the test fixture 110 may contact a bottom surface of the pedestal 175 of the heatsink 120, as described above.

As further shown in FIG. 4, process 400 may include providing power to heaters of a heater block of the test fixture to cause the heaters to provide heat to the heatsink via the bottom surface of the pedestal of the heatsink, wherein the thermocouple probe is configured to pass through an opening of the heater block (block 430). For example, the computing device 115 may provide power to the heaters 150 of the heater block 145 of the test fixture 110 to cause the heaters 150 to provide heat to the heatsink 120 via the bottom surface of the pedestal 175 of the heatsink 120, as described above. In some implementations, the thermocouple probe 160 is configured to pass through an opening of the heater block 145.

As further shown in FIG. 4, process 400 may include receiving a temperature reading from the thermocouple probe (block 440). For example, the computing device 115 may receive a temperature reading from the thermocouple probe 160, as described above.

As further shown in FIG. 4, process 400 may include receiving an air temperature reading from an air temperature sensor associated with the heatsink (block 450). For example, the computing device 115 may receive an air temperature reading from an air temperature sensor associated with the heatsink 120, as described above.

As further shown in FIG. 4, process 400 may include calculating a thermal resistance of the heatsink based on the temperature reading, the air temperature reading, and the power provided to the heaters (block 460). For example, the computing device 115 may calculate a thermal resistance of the heatsink 120 based on the temperature reading, the air temperature reading, and the power provided to the heaters 150, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A test fixture for a heatsink, the test fixture comprising:
   a probe assembly with a thermocouple probe configured to:
      removably contact a bottom surface of a pedestal of the heatsink, and
      measure a surface temperature of the heatsink;
   an insulator housing configured to:
      house the probe assembly and a heater block, and
      insulate the probe assembly from the heater block;
   the heater block being provided within the insulator housing and configured to provide heat to the heatsink via the bottom surface of the pedestal of the heatsink; and
   a mounting block connected to the insulator housing and configured to connect to the heatsink.

2. The test fixture of claim 1, wherein the heatsink comprises:
   the pedestal;
   a base portion connected to the pedestal; and
   a plurality of fins connected to the base portion.

3. The test fixture of claim 1, wherein the insulator housing comprises:

a body portion with a first opening to house the heater block;
a bottom portion with a second opening to house the probe assembly; and
a top portion with a third opening through which a top portion of the heater block is provided.

4. The test fixture of claim 1, wherein the heater block comprises:
a base portion with one or more openings for receiving and retaining one or more heaters; and
a top portion connected to the base portion and configured to provide heat to the heatsink via the bottom surface of the pedestal of the heatsink,
wherein an opening is provided through the base portion and the top portion of the heater block, and the thermocouple probe of the probe assembly is provided through the opening.

5. The test fixture of claim 1, wherein the insulator housing comprises:
a body portion with openings for housing the heater block and the probe assembly and with one or more openings through which one or more heaters are provided to the heater block.

6. The test fixture of claim 1, wherein the probe assembly comprises:
a base portion connected to the thermocouple probe; and
a spring-loaded collet assembly connected to the base portion and configured to cause the thermocouple probe to removably contact the bottom surface of the pedestal of the heatsink.

7. The test fixture of claim 1, further comprising:
one or more heaters configured to provide heat to the heater block.

8. A test system for a heatsink, the test system comprising:
a test fixture that includes:
a probe assembly with a thermocouple probe configured to:
removably contact a bottom surface of a pedestal of the heatsink, and
measure a surface temperature of the heatsink;
an insulator housing configured to:
house the probe assembly and a heater block, and
insulate the probe assembly from the heater block;
the heater block being provided within the insulator housing and including one or more heaters configured to provide heat to the heatsink via the bottom surface of the pedestal of the heatsink;
a mounting block connected to the insulator housing and configured to connect to the heatsink; and
a computing device configured to:
provide power to the one or more heaters to cause the one or more heaters to provide heat to the heatsink via the bottom surface of the pedestal of the heatsink;
receive, from the thermocouple probe, a temperature reading indicating the surface temperature of the heatsink; and
calculate a thermal resistance of the heatsink based on the temperature reading.

9. The test system of claim 8, wherein the test system further comprises an air temperature sensor, and the computing device is configured to:
receive an air temperature reading from the air temperature sensor; and
calculate the thermal resistance of the heatsink based on the temperature reading, the air temperature reading, and the power provided to the one or more heaters.

10. The test system of claim 8, wherein the insulator housing comprises:
a body portion with a first opening to house the heater block;
a bottom portion with a second opening to house the probe assembly; and
a top portion with a third opening through which a top portion of the heater block is provided.

11. The test system of claim 8, wherein the heater block comprises:
a base portion with one or more openings for receiving and retaining the one or more heaters; and
a top portion connected to the base portion and configured to provide heat to the heatsink via the bottom surface of the pedestal of the heatsink,
wherein an opening is provided through the base portion and the top portion of the heater block and the thermocouple probe of the probe assembly is provided through the opening.

12. The test system of claim 8, wherein the insulator housing comprises:
a body portion with openings for housing the heater block and the probe assembly and with one or more openings through which the one or more heaters are provided to the heater block.

13. The test system of claim 8, wherein the probe assembly comprises:
a base portion connected to the thermocouple probe; and
a spring-loaded collet assembly connected to the base portion and configured to cause the thermocouple probe to removably contact the bottom surface of the pedestal of the heatsink.

14. The test system of claim 8, wherein the heatsink comprises:
the pedestal;
a base portion connected to the pedestal; and
a plurality of fins connected to the base portion.

15. A test fixture for a heatsink, the test fixture comprising:
a probe assembly with a thermocouple probe configured to:
removably contact a bottom surface of a pedestal of the heatsink, and
measure a surface temperature of the heatsink; and
an insulator housing configured to:
house the probe assembly and a heater block, and
insulate the probe assembly from the heater block,
wherein the heater block is provided within the insulator housing and is configured to provide heat to the heatsink via the bottom surface of the pedestal of the heatsink.

16. The test fixture of claim 15, wherein the heatsink comprises:
the pedestal;
a base portion connected to the pedestal; and
a plurality of fins connected to the base portion.

17. The test fixture of claim 15, wherein the insulator housing comprises:
a body portion with a first opening to house the heater block;
a bottom portion with a second opening to house the probe assembly; and
a top portion with a third opening through which a top portion of the heater block is provided.

18. The test fixture of claim 15, wherein the heater block comprises:

a base portion with one or more openings for receiving and retaining one or more heaters; and a top portion connected to the base portion and configured to provide heat to the heatsink via the bottom surface of the pedestal of the heatsink, wherein an opening is provided through the base portion and the top portion of the heater block, and wherein the thermocouple probe of the probe assembly is provided through the opening.

19. The test fixture of claim 15, wherein the insulator housing comprises:

a body portion with openings for housing the heater block and the probe assembly and with one or more openings through which one or more heaters are provided to the heater block.

20. The test fixture of claim 15, further comprising:

one or more heaters configured to provide heat to the heater block.

* * * * *